United States Patent [19]

Tsuge et al.

[11] 4,441,738
[45] Apr. 10, 1984

[54] SEAT BELT TENSIONING DEVICE

[75] Inventors: Noboru Tsuge, Kariya; Toshiaki Shimogawa, Okazaki; Satosi Kuwakado, Aichi; Toshihiro Takei, Kariya, all of Japan

[73] Assignee: Nippon Soken, Inc., Nishio, Japan

[21] Appl. No.: 309,407

[22] Filed: Oct. 7, 1981

[30] Foreign Application Priority Data

Dec. 30, 1980 [JP] Japan ............................ 55-190057[U]

[51] Int. Cl.³ .............................................. B60R 21/10
[52] U.S. Cl. ...................................... 280/806; 60/632
[58] Field of Search ................ 280/806; 297/476, 477, 297/478, 479, 480; 60/632, 635, 636, 638

[56] References Cited

U.S. PATENT DOCUMENTS

| | | | |
|---|---|---|---|
| 2,768,375 | 10/1956 | Catlin | 60/636 |
| 4,222,462 | 9/1980 | Ottestad | 60/638 |
| 4,232,886 | 11/1980 | Tsuge | 280/806 |
| 4,258,934 | 3/1981 | Tsuge | 280/806 |
| 4,328,976 | 5/1982 | Tsuge | 280/806 |

Primary Examiner—Bruce H. Stoner, Jr.
Assistant Examiner—John A. Carroll
Attorney, Agent, or Firm—Cushman, Darby & Cushman

[57] ABSTRACT

A seat belt tensioning device includes a cylinder and a piston, one fixed to a vehicle and the other to a seat belt. Means are provided for operating the cylinder, on impact, to retract a piston rod and tension the belt. The piston rod is provided with a load limiting portion to be broken when the tension load of the seat belt reaches a predetermined value. Means are provided for locking the piston in the cylinder when the load limiting portion is broken. A second rod connects the seat belt and the piston when the load limiting portion is broken. The second rod is provided with a plastically deformable portion in contact with the piston. When the tension force of the seat belt applied to the piston through the second rod increases, the plastically deformable portion is deformed to absorb the kinetic energy of the passenger.

11 Claims, 4 Drawing Figures

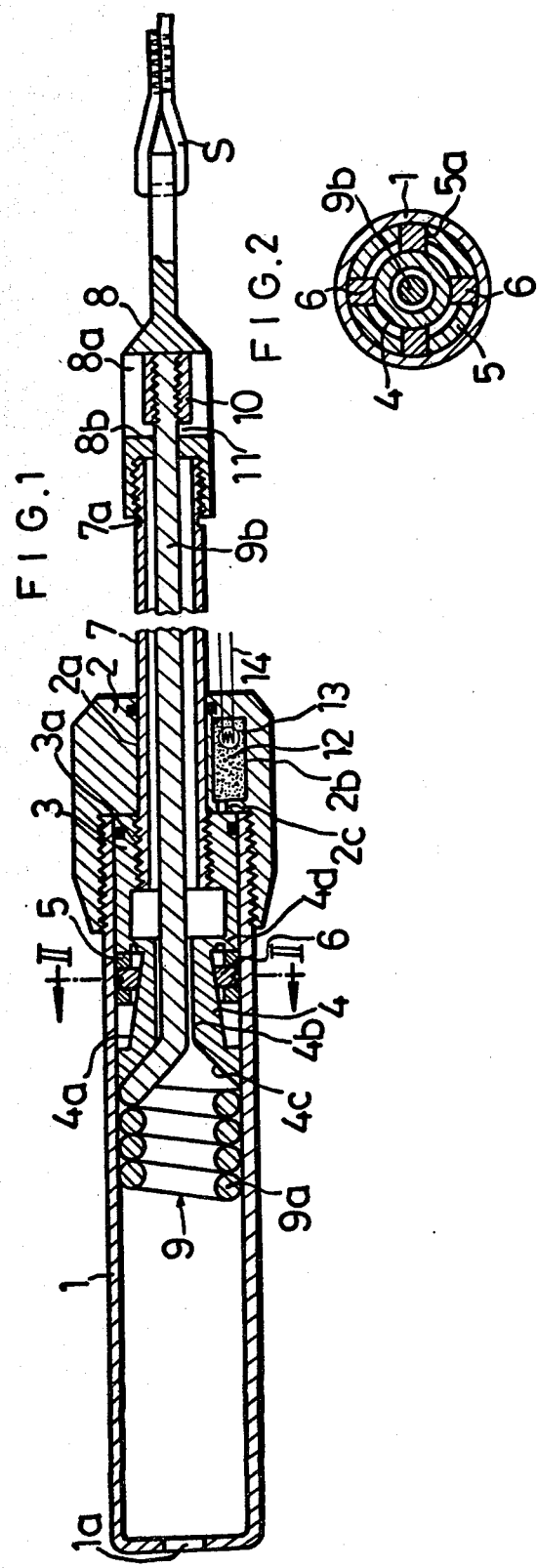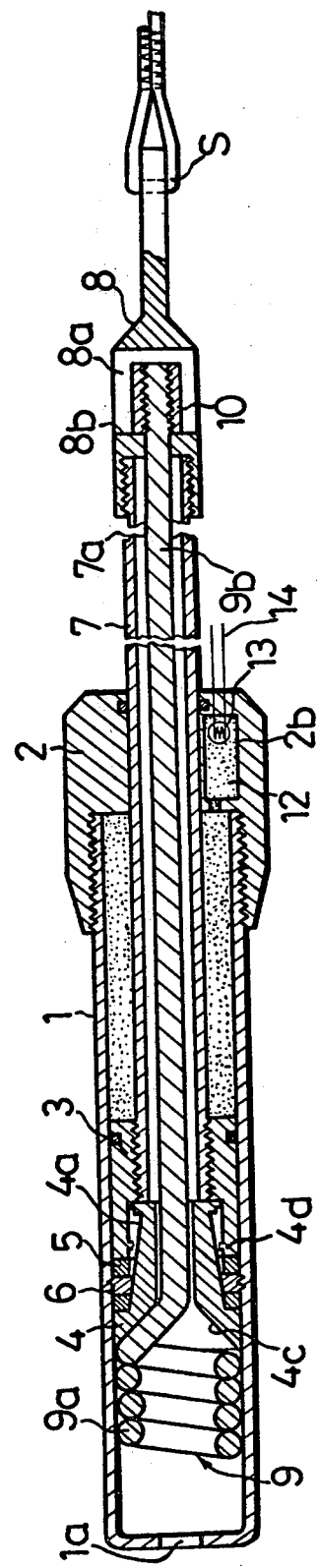

SEAT BELT TENSIONING DEVICE

BACKGROUND OF THE INVENTION

The present invention relates to a seat belt tensioning device to be installed on a vehicle.

Conventionally, the seat belt tensioning device of this type is provided with a cylinder, a piston which is slidably inserted within the cylinder and is directly or indirectly connected to a seat belt and a piston operating means which moves the piston within the cylinder to tension the belt at an urgent or critical time such as upon a vehicle impact. When the piston is moved to tension the seat belt by the piston operating means upon a vehicle impact, the seat belt is tensioned to hold the passenger on his seat. As the piston operating means, gas pressure or the like is utilized.

In one example of the conventional seat belt tensioning device of this type, the seat belt is connected to the piston through a deformable member which is plastically deformed under a predetermined load. Upon a vehicle impact, the seat belt is elongated by the deformable member only to such an extent that the passenger does not collide against the front panel of the vehicle and the like, i.e., a secondary impact. The kinetic energy of the passenger is absorbed in the elongating process of the seat belt.

However, in the above described conventional seat belt tensioning device, it is very difficult to adjust the tension force of the seat belt to a precise desired value by the piston operating means utilizing gas pressure or the like. In other words, a constant tension force cannot always be obtained.

If the tension force of the seat belt is small, the passenger is in danger of a secondary impact. If the tension force becomes too large, the passenger is in danger of being injured by the tensioned seat belt itself.

In the conventional seat belt tensioning device of the type wherein the kinetic energy of the passenger is absorbed by the deformable member, the piston operating force produced by the piston operating means is not always maintained constant. Therefore, if the piston operating force is too large, the deformable member starts to be elongated while the piston is being moved by the piston operating means. As a result, the desired extension of the deformable member for absorbing the kinetic energy of the passenger cannot be obtained.

Accordingly, one object of the present invention is to provide a seat belt tensioning device wherein the tension load of the seat belt applied to the passenger can be precisely adjusted to a desired value regardless of variations of the piston operating force of the piston operating means.

Another object of the present invention is to provide a seat belt tensioning device in which an energy absorbing member effectively operates to absorb the kinetic energy of the passenger.

DESCRIPTION OF THE DRAWINGS

Other objects and advantages of the invention will become apparent from the following description of an embodiment with reference to the accompanying drawings wherein:

FIG. 1 to FIG. 4 show one embodiment of the seat belt tensioning device of the present invention;

FIG. 1 is a longitudinal sectional view of the seat belt tensioning device before operation;

FIG. 2 is a cross sectional view taken along the line II—II of FIG. 1; and

FIG. 3 and FIG. 4 are longitudinal sectional views of the seat belt tensioning device under operation.

SUMMARY OF THE INVENTION

Figure 4:
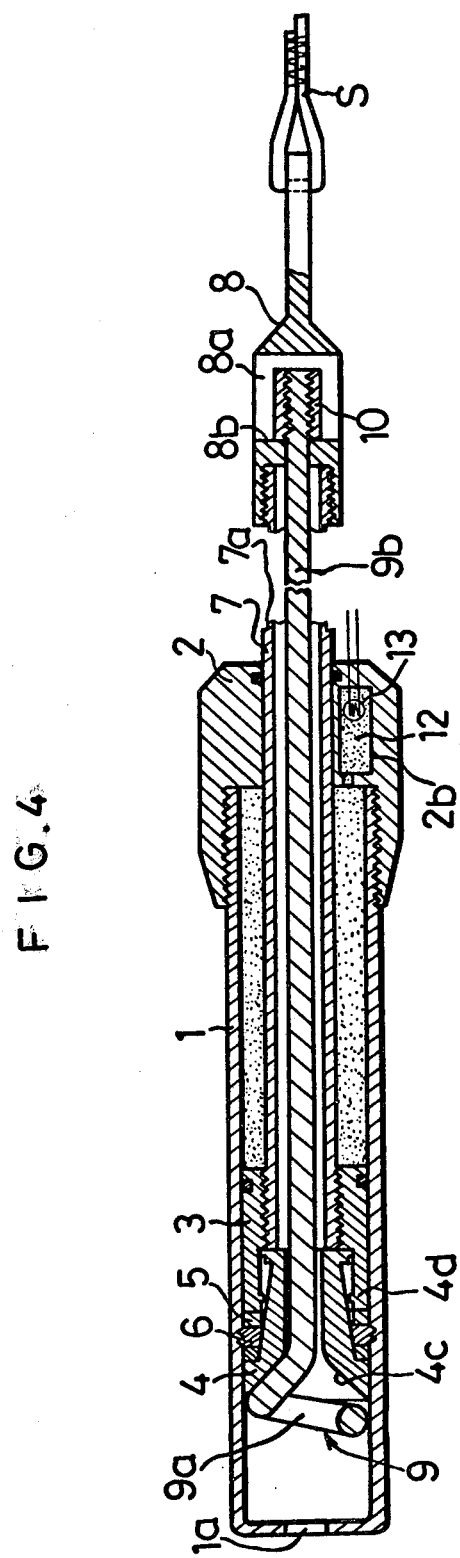

The seat belt tensioning device of the present invention is characterized in that it comprises a first connecting means for connecting a seat belt to a piston which is slidably inserted within a cylinder, a load limiting means for breaking the first connecting means to disconnect the piston from the seat belt when the tension load of the seat belt reaches a predetermined value, and a second connecting member for connecting the seat belt to the piston when the first connecting means is broken by means of the load limiting means, and a piston locking means for locking the piston in the cylinder when the piston is disconnected from the seat belt by means of the load limiting means.

According to the seat belt tensioning device of the present invention, the tension load of the seat belt can be precisely adjusted to a predetermined value which is determined by the load limiting means. The energy absorbing member effectively operates only to absorb the kinetic energy of the passenger.

Furthermore, the load which is determined by the load limiting means and that which is determined by the energy absorbing member are appropriately controlled.

DETAILED DESCRIPTION OF THE INVENTION

Hereinafter, the present invention will be explained in detail according to one embodiment with reference to the drawings.

To one end of a cylinder 1 fixed to a vehicle (not shown), a thick walled cylinder head 2 is screwed and in the other end of the cylinder 1, an air vent hole 1a is formed. In the axially central portion of the cylinder head 2, a through hole 2a is formed.

Within the cylinder 1 is a piston assembly which is composed of a cylindrical main body 3 and a tapered extension member 4 which are integrally connected to each other by means of a thin walled portion 4d which breaks under a predetermined load. The portion 4d is located at the outer end of a recess or cavity in the body 3. Hereinafter, the cylindrical main body 3 will be called "piston 3". The piston 3 member 4 are provided with axial through holes 3a and 4b, respectively.

The member 4 is provided with a frusto-conical peripheral surface 4a which enlarges towards the end remote from the piston 3. The inner wall of the member 4, defining the through hole 4b, enlarges towards the remote end of the member into a cone shape to form a die portion 4c which, under load as explained hereinafter, squeezes a plastically deformable portion 9a of an energy absorbing member 9.

In the space which is formed between the peripheral surface 4a of the member 4 and the inner wall of the cylinder 1, a ring shaped stopper pieces retaining member 5 is slidably inserted relative to the cylinder 1. The inner diameter of member 5 is less than that of the narrower end of the surface 4a. In the retaining member 5, four radial guide holes 5a are formed, and a stopper piece 6 is slidably inserted within each guide hole. The inner end of each stopper piece 6 is supported by the inclined peripheral surface 4a of the member 4, while the outer end is sharp or rough and slidably contacts the inner wall of the cylinder 1.

One end of a hollow piston rod 7 is screwed into the through hole 3a of the piston 3 with the rod slidably and sealingly extending through the hole 2a in the cylinder head 2. The other or outer end of the rod 7 is screwed into a joint member 8 which is connected to the seat belt S.

One portion of the rod 7 near the member 8" is provided with a thin walled portion 7a which forms a load limiting portion. When the tension force of the seat belt S reaches a predetermined value, the thin walled portion 7a of the first rod 7 is broken.

The energy absorbing member 9 is made of steel wire and is composed of a coil shaped plastically deformable portion 9a and a straight rod portion (a second rod) 9b. The plastically deformable portion 9a is engaged with the die portion 4c of the member 4 within the cylinder 1 and the rod portion 9b movably extends through the hole 4b of the member 4 and through the rod 7. The outer end of the rod portion 9b is screwed into a nut 10 which is accommodated within a cavity formed in the joint member 8. The nut 10 normally is spaced from a joint member surface 8b facing the belt S by a predetermined interval or distance 11.

The thin walled portion 4d connecting the member 4 and the piston 3 is broken by a predetermined load lower than that which breaks the thin walled portion 7a of the rod 7 and higher than the maximum inertia force applied to the energy absorbing member 9, the member 4 and the nut 10.

Within the cylinder head 2, a powder chamber 2b is formed. The powder chamber 2b is communicated with the inside of the cylinder 1 through a passage 2c. Within the powder chamber 2b, a propellant 12 is charged and an ignition filament 13 is buried therein. The ignition filament 13 is connected to an impact sensor (not shown), which detects the vehicle impact and generates electric signals, through a lead wire 14. These members compose a piston operating means.

Hereinafter, the operation of the seat belt tensioning device will be explained.

Upon a vehicle impact, the ignition filament 13 is electrified and generates heat, on receiving electric signals from the impact sensor, and the propellant 12 is exploded to generate gas. The pressure of the gas moves the piston 3 to retract the rod 7a, i.e. leftwards from the position shown in FIG. 1. At this time, the joint member 8 and the seat belt S, which are connected to the piston 3 through rod 7, move together with the piston 3. The member 4 and the energy absorbing member 9 also move together with the piston 3. As a result, the seat belt S is tensioned to restrain the passenger on his seat.

When the tension force of the seat belt S reaches the breaking load of the load limiting portion 7a, the portion 7a is broken so that rod 7 is separated from the joint member 8, as shown in FIG. 3. The nut 10 into which the second rod 9b is screwed then engages with the surface 8b of the joint member 8.

At this time, the member 4 is forced inward of the cavity in the piston 3 by the seat belt S acting through the plastically deformable portion 9a, the rod portion 9b and the joint member 8. Consequently, the thin walled portion 4d connecting the piston 3 and the member 4 is broken. Then, the piston 3 moves relative to the member 4, due to the high gas pressure, and pushes the member 5, together with the stopper pieces 6, toward the large end of the frusto-conical surface 4a.

As a result, each stopper piece 6 is cammed radially outward so that the sharp outer end of each stopper piece cuts into the wall of the cylinder 1 to lock the member 4 thereto and prevent further movement of the member 4.

Then when the load of the passenger applied to the seat belt S reaches a predetermined value, portion 9a of the energy absorbing member 9 is plastically deformed, by being squeezed by the die portion 4c of the taper member 4, and is gradually drawn out of the cylinder 1 to thus absorb the kinetic energy of the passenger.

In case the tension load applied to the seat belt S does not reach the predetermined value by which the thin walled portion 7a is broken, the piston 3 and the member 4 are stopped at the time when the piston operating force is balanced with the tension load of the seat belt S. The member 5 and the stopper pieces 6 then continue to move to the left, as shown in FIG. 3, due to inertia forces, and the stopper pieces 6 are cammed out by the member 4 so that the outer ends of the stopper pieces 6 cut into the cylinder 1. As a result, the member 4 is locked to the cylinder 1.

Then, when the load of the passenger applied to the seat belt S is increased to a predetermined value, the thin walled portion 4d formed between the piston 3 and the member 4 is broken. Next, the thin walled portion 7a which is formed in the rod 7 is broken and the nut 10 connected to the rod portion 9b is engaged with the surface 8b in the joint member 8 so that the rod portion 9b is tensioned by the seat belt S. Then, the energy absorbing member 9 is drawn out of the cylinder 1 to absorb the kinetic energy of the passenger in the same process as described above.

In the embodiment of the present invention, the straight portion 9b of the energy absorbing member 9 is integral with the portion 9a. The rod portion 9b can be formed, however, separately of the member 9a and simply connected thereto.

The plastically deformable member 9a can be formed of a wave-shaped, or spiral-shaped thin steel plate in place of a coil-shaped steel wire.

As the piston operating means, a high pressure gas cylinder, a spring or the like can be substituted for the propellant.

As the load limiting member, any means for separating the rod 7 from the seat belt S under a predetermined load can be employed in place of making one portion of the wall of the rod thin.

As described above, the seat belt tensioning device of the present invention is provided with a load limiting means for limiting the tension load applied to the seat belt S, and an energy absorbing member which is plastically deformed to be elongated for allowing the seat belt to be drawn out of the device. Further, the energy absorbing member has such a structure as to be plastically deformed after the piston is stopped when the tension load applied to the seat belt S reaches a predetermined value which is determined by the load limiting means. Therefore, the energy abosorbing member can be effectively used only for absorbing the kinetic energy of the passenger.

The above described predetermined load for stopping the piston can be determined only by the load limiting means without being influenced by the plastically deforming load of the energy absorbing member. Therefore, the tension force of the seat belt can be always maintained within a predetermined range under any condition of the vehicle impact.

Furthermore, as described in the embodiment of the present invention, by forming a thin walled portion in the piston rod near the joint member connected to the seat belt, the tension load of the thin walled portion can be made nearly equal to that of the seat belt. Therefore, the tension force of the seat belt can be freely limited to a desired value.

Having now fully described the invention, it will be apparent to one of ordinary skill in the art that many changes and modifications can be made thereto without departing from the spirit or scope of the invention as set forth herein.

What is claimed is:

1. A seat belt tensioning device to be mounted on a vehicle, comprising:
   a cylinder installable on a vehicle;
   a piston slidable in said cylinder and adapted to be connected to the belt for tensioning the latter on movement of said piston in one direction;
   means for moving said piston in said one direction at an urgent time, e.g. on an impact of the vehicle;
   a first means for connecting said piston to said seat belt, said first means including load-limiting means for disconnecting the seat belt from said piston when a predetermined tension load is applied to said load limiting means;
   a second means for connecting said piston to the seat belt when the seat belt is disconnected from said piston by said load limiting means;
   means for locking said piston to said cylinder to prevent belt-tensioning movement of said piston when a predetermined tension load is applied to said second connecting means; and
   said second connecting means including energy absorbing means elongatable by a predetermined load for absorbing kinetic energy of the passenger restrained by the belt.

2. A seat belt tensioning device according to claim 1, wherein:
   said piston moving means comprises a high gas pressure generating device which is communicated with said cylinder.

3. a seat belt tensioning device according to claim 2, wherein:
   said high gas pressure generating device comprises;
   a powder chamber wherein a propellant is charged; and
   an ignition means for exploding said propellant at an urgent time.

4. A seat belt tensioning device according to claim 1, wherein:
   said first connecting means comprises a hollow piston rod, one end of which is connected to said piston, and a joint member connected to the other end of said rod and adapted to be connected to the seat belt.

5. A seat belt tensioning device according to claim 4, wherein:
   said second connecting means comprises a rod means extending through said piston rod so as to move relatively thereto;
   one end of said rod means being connected to said piston through said energy absorbing means and the other end thereof being adapted to be connected to the seat belt through said joint member.

6. A seat belt tensioning device according to claim 4, wherein:
   said load limiting means comprises a thin walled portion which is formed in said piston rod near said joint member, said thin walled portion being broken by a predetermined tension load.

7. A seat belt tensioning device according to claim 5, wherein;
   said joint member comprises a first connecting means retaining portion to which said first connecting means is attached and a cavity which is formed adjacent to said retaining portion;
   said first connecting means retaining portion being provided with an axially extending through hole through which said second connecting means slidably extends into said cavity; and
   said second connecting means being fixed to a second connecting means retaining portion within said cavity so that opposed surfaces of said second connecting means retaining portion and a wall of said cavity are spaced by a predetermined interval.

8. A seat belt tensioning device according to claim 5, wherein:
   said energy absorbing means is composed of a metallic deformable member which is elongated by a predetermined load; and
   said metallic deformable member is closely contacted with said piston and is connected to one end of said rod means.

9. A seat belt tensioning device according to claim 8, wherein:
   said second connecting means and said energy absorbing means are integrally formed of one metallic wire; and
   said metallic deformable member is shaped like a coil.

10. A seat belt tensioning device according to claim 9, wherein;
    said piston comprises a cylindrical main body to which one end of said first connecting means is connected and to which the force of the piston moving means is applied and a hollow extension member which is coaxially connected to said main body through a connecting portion which is formed in an end of said main body and which is broken by a predetermined load;
    said extension member being provided with an axially extending through hole; a frusto-conical outer peripheral surface which enlarges away from said piston; and a cone shaped die portion which is formed in the opening end of said through hole and enlarges outward of said piston;
    said piston locking means comprising a plurality of stopper pieces and an annular stopper pieces retaining member which is disposed between the inner wall of said cylinder and said frusto-conical peripheral surface of said extension member;
    said stopper pieces retaining member being provided with radial guide holes slidably retaining said stopper pieces;
    the outer end of each stopper piece being sharpened and in contact with the inner wall of said cylinder; and
    the other end of each stopper piece being engaged with said peripheral surface of said extension member.

11. A seat belt tensioning device according to claim 10, wherein:
    said coil shaped metallic deformable member is disposed in close contact with said extension member; and
    said metallic wire extends along said cone shaped die portion and through said axially extending through hole in said extension member.

* * * * *